(12) United States Patent
Paulukat

(10) Patent No.: US 12,492,981 B2
(45) Date of Patent: Dec. 9, 2025

(54) METHOD AND DEVICE FOR TESTING THE ADHESION OF A BODY ON A SUBSTRATE

(71) Applicant: LTS LOHMANN THERAPIE-SYSTEME AG, Andernach (DE)

(72) Inventor: Dieter Paulukat, Kattenes (DE)

(73) Assignee: LTS LOHMANN THERAPIE-SYSTEME AG, Andernach (DE)

( * ) Notice: Subject to any disclaimer, the term of this patent is extended or adjusted under 35 U.S.C. 154(b) by 321 days.

(21) Appl. No.: 18/279,954

(22) PCT Filed: Feb. 25, 2022

(86) PCT No.: PCT/EP2022/054780
§ 371 (c)(1),
(2) Date: Sep. 1, 2023

(87) PCT Pub. No.: WO2022/184572
PCT Pub. Date: Sep. 9, 2022

(65) Prior Publication Data
US 2024/0151635 A1 May 9, 2024

(30) Foreign Application Priority Data
Mar. 1, 2021 (DE) ...................... 10 2021 104 874.5

(51) Int. Cl.
*G01N 19/04* (2006.01)
(52) U.S. Cl.
CPC ..... *G01N 19/04* (2013.01); *G01N 2203/0007* (2013.01); *G01N 2203/0017* (2013.01); *G01N 2203/0019* (2013.01)

(58) Field of Classification Search
CPC ........... G01N 19/04; G01N 2203/0007; G01N 2203/0017; G01N 2203/0019
See application file for complete search history.

(56) References Cited

U.S. PATENT DOCUMENTS

| 6,308,560 B1 | 10/2001 | Bracht |
| 2010/0326217 A1 | 12/2010 | Makoto |
| 2017/0290779 A1 | 10/2017 | Tolia et al. |

FOREIGN PATENT DOCUMENTS

| CN | 204556478 U | 8/2015 |
| CN | 208476753 U | 2/2019 |
| DE | 20005615 U1 | 5/2000 |
| RU | 2210753 C1 | 8/2003 |
| WO | 98/46980 A1 | 10/1998 |

*Primary Examiner* — Jonathan M Dunlap
(74) *Attorney, Agent, or Firm* — Norris McLaughlin, P.A.

(57) ABSTRACT

Disclosed are a method and device for testing the adhesion of an adhesive, planar body on a planar substrate, wherein the planar body is applied adhesively on the substrate, the substrate is moistened, and a mechanical force is exerted on the substrate by means of an element in the form of a dumbbell-shaped magnetic stirring rod acting on the side of the substrate facing away from the adhesively applied body, wherein the substrate is repeatedly reversibly deformed at least in parts of the adhesive region of the planar body by means of the exertion of force, and, after a period of time, exertion of the mechanical force is ended, and the remaining adhesion of the planar body is assessed in qualitative and/or quantitative terms.

17 Claims, 4 Drawing Sheets

METHOD AND DEVICE FOR TESTING THE ADHESION OF A BODY ON A SUBSTRATE

Figure 1:
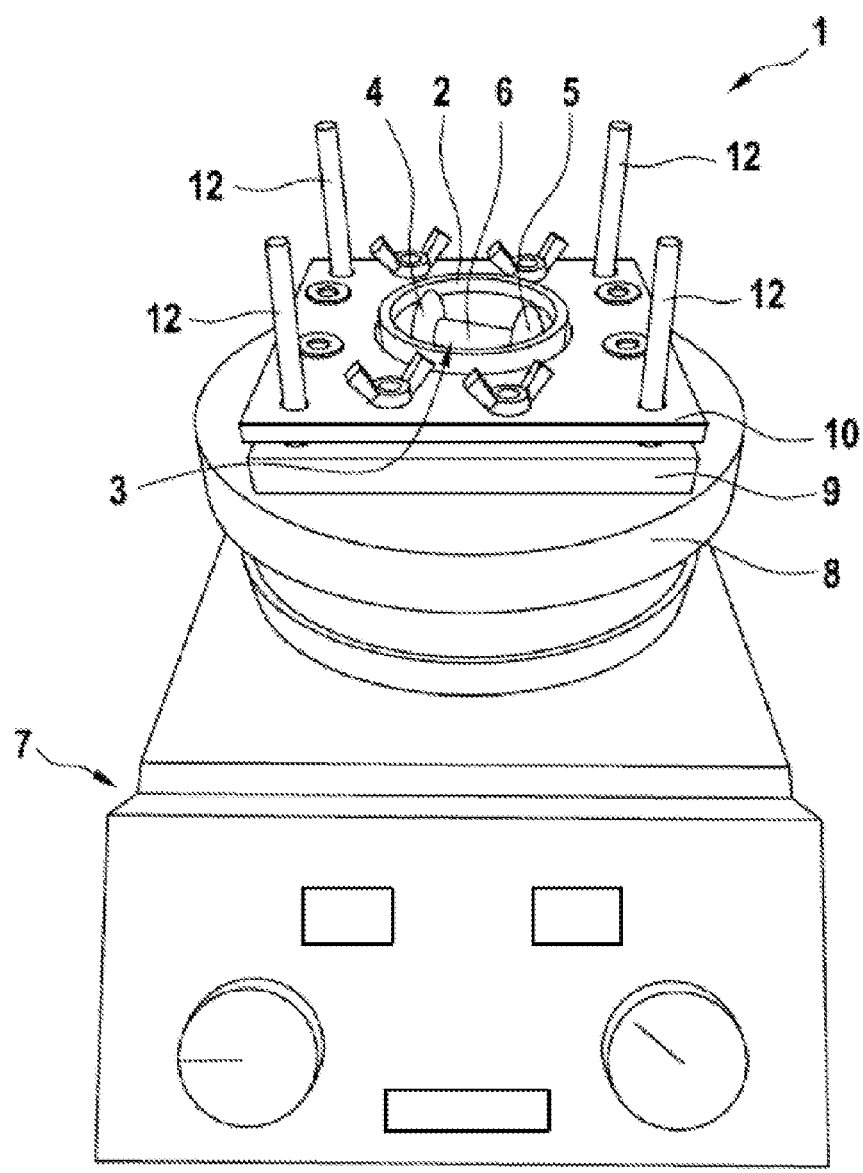

This application is a 371 of International Patent Application No. PCT/EP2022/054780, filed Feb. 25, 2022, which claims priority of German Patent Application No. 10 2021 104 874.5, filed Mar. 1, 2021, the disclosures of which patent applications are hereby incorporated herein by reference.

The invention relates to a method for testing the adhesion of an adhesive, planar body on a planar substrate, preferably for assessing the adhesion of a multilayered transdermal therapeutic system, and to a testing device for carrying out the method.

Transdermal therapeutic systems (TTS) are planar pharmaceutical products built up in layers which are intended to allow a continuous supply of an active substance via the human skin over a certain application time period. Nicotine plasters, plasters intended to combat travel sickness, and hormone replacement therapy by means of TTS, especially for women experiencing the menopause, are certainly the most well-known examples here. In transdermal therapeutic systems, an active substance carrier film is generally provided, namely a carrier film which is coated with a polymer compound that contains the active substance and adheres to the skin. In this case, one or more active substances, with or without auxiliaries, can be embedded in the polymer matrix. In the systems, an additional adhesive carrier layer can additionally be provided, namely a carrier layer which is coated with an adhesive free from the active substance and is arranged on the rear side of the active substance carrier film, the side facing away from the skin, and which covers the active substance carrier film at the edges and is provided in order to improve adhesion on the skin. One example of a transdermal therapeutic system of this kind is disclosed in US 2017/0290779 A1, for instance.

One essential property is the sufficiently secure and long-term adhesion of such transdermal therapeutic systems on the skin. While simple sticking plasters can easily be exchanged when the adhesion declines, and this has no impact on health and is economically insignificant, detachment of transdermal therapeutic systems from the skin leads to the interruption of the supply of active substance and can therefore entail more severe consequences.

RU 2 210 753 C1 discloses a test appliance which can be used to determine and check the relaxation properties of the skin and other similar materials.

The appliance makes it possible, with high accuracy, in an automated mode and without destroying the sample, to obtain a complex of up to fifteen indicators of elastic, viscous and plastic properties and a spectrum of relaxation times of the material that best characterize its deformation behavior, reflecting the mobility of the various elements of the internal micro- and macrostructure.

CN 2 08 476 753 U discloses a device for detecting paper/plastic bags, which comprises a workbench, a grip block, a fixed plate and a turntable. It is characterized inter alia in that the surface of the workbench is provided with a notch (2), which is securely connected to the plate surface of the workbench.

CN 2 04 556 478 U discloses a testing unit for the friction color fastness of textiles. This allows improved working efficiency and reduces working costs since the sample does not have to be clamped twice.

US 2017/0290779 A1 relates to a device for releasing active substances to the skin or mucosa of a host. In particular, this document relates to transdermal plasters that minimize migration of the active substance and to a process for producing the devices in a continuous manufacturing process.

DE 200 05 615 U1 discloses a device for measuring the peel adhesion of plasters, thereby enabling the adhesiveness of plasters on the human skin to be measured under standardized conditions.

WO 98/46 980 A1 relates to a method and a device for determining the adhesion behavior of adhesive sheetlike structures, such as medical adhesive tape and, especially, adhesive application systems such as transdermal therapeutic systems (TTS) on the skin of humans or mammals.

Since, in some applications, the pharmacologically active substances contained in the active substance plaster of the transdermal therapeutic system are expensive, the active substance plasters are often cut to an angular, e.g. square, shape in order to minimize cutting losses. However, angular plasters come away from the skin more easily. Even if an additional fixing plaster is stuck on top for better adhesion, something which incidentally can lead to unwanted migration phenomena of the active substance, such measures do not necessarily lead to better adhesion and are furthermore less economical.

It would therefore be desirable to pretest the adhesion properties in order to arrive at a design and configuration which combine adequate adhesion and sensible and economical configuration of the systems.

However, there has hitherto been a lack of sufficiently informative test methods and testing devices for assessing long-term adhesion on human skin. In particular, it is difficult to simulate the movements of the affected parts of the skin and the simultaneous long-term loads on the systems due to moisture or sweat.

Various devices and methods for the stationary testing of the adhesion of layers or planar applications on surfaces are known in the prior art.

Thus, DE 200 05 615 U1 discloses a device for measuring the adhesive strength of plasters on human skin, in which a lifting device is connected to a plaster by means of a thread and the tensile force during removal is measured by means of a force sensor. It is undoubtedly a disadvantage here, on the one hand, that a test subject is required and, on the other hand, that although an absolute measurement of the tensile force required for detachment is possible, it does not provide any information on long-term adhesion during movement and change in the moisture of the skin.

WO 9846980 A1 discloses a method and a device for determining the adhesive behavior of adhesive sheetlike structures, including transdermal therapeutic systems, which are applied to an elastic carrier film for testing. The carrier film is then clamped in a test cell and subjected at repeated time intervals to the imposition and relief of alternating elastic strains by defined loading forces from the side facing away from the sheetlike structure, inter alia by means of a magnetic stirring rod. The disadvantage here is that the load is applied by an object/magnetic stirring rod acting on the upper side of the freely clamped and only centrally supported carrier film. As a result, weight-related and acceleration-related forces additionally act on the sheetlike structure and can distort the result.

It was accordingly the object of the present invention to provide an improved test method and an improved device for qualitative assessment of the adhesion of an adhesive, planar body on a planar substrate that simulate the actually occurring load situations and ambient conditions to which an adhesive, planar body applied to a planar substrate, including, for example, a body of this kind applied to human skin, is subjected and that enable simple qualitative assessment and are sufficiently informative.

This object is achieved by the features of independent claim 1. The object is likewise achieved by the features of a testing device as claimed in claim 13. Further advantageous embodiments are disclosed in the respective dependent claims.

First of all, the adhesive, planar body is applied adhesively to the planar substrate, after which the substrate is moistened, advantageously fully to saturation or is impregnated. After this, a mechanical force is exerted on the planar substrate by means of an element in the form of a dumbbell-shaped stirring rod acting on the side of the substrate facing away from the adhesive, planar body, more specifically in such a way that the action of the force reversibly deforms the substrate repeatedly or in an oscillating manner, at least in the parts in which the adhesive region of the adhesive, planar body is situated. After a period of time encompassing a predetermined load population, the mechanical loading is ended, and the remaining adhesion of the adhesive, planar body, in particular the remaining adhesion at the edges thereof, is assessed.

According to the invention, it is envisaged here that the force which repeatedly deforms the planar substrate is exerted, by a dumbbell-shaped magnetic stirring rod driven by a magnetic stirrer and movable in a vessel open at the top, in such a way or by virtue of the fact that the dumbbell-shaped magnetic stirring rod rotates underneath the substrate while deforming the latter. The vector of the force for deformation thus points in a direction out of the vessel opening.

This provides a very simple and informative test method which is described by a reproducible load population, namely by the clear specification of a time period in conjunction with, for example, a defined deformation of the planar substrate and a repetition of a deformation per unit time. The number of deformations per unit time can be set by means of a specified speed of rotation of an object used for the deformation, for example.

The loading from the underside of the planar substrate, as employed here in comparison with the known prior art, eliminates unwanted influences on the load due to the dead weight of the dumbbell-shaped magnetic stirring rod or due to the gravitational force acting on the planar substrate and thus simulates the loads that are actually imposed by the movements of a body part on a planar body stuck to the skin of the body part.

Tests have shown that a planar substrate in the form of a wash leather (chamois leather), a split leather or a grained synthetic leather film can advantageously be used as a test substrate. While wash leather and split leather simulate particularly well the moisture load and the change in its effect on an applied adhesive, planar body or on a TTS, a grained synthetic leather film, for example, approximately simulates the surface structure of skin. If the method according to the invention is used to test the behavior of a TTS successively on a plurality of these sheetlike substrates, an informative overview of its adhesiveness is obtained. Of course, under certain conditions, it is also possible to use artificial skin or even animal or human skin as a planar substrate.

Another advantageous embodiment consists in that the planar substrate is moistened to saturation or impregnation, preferably to saturation with demineralized water. This makes it possible to simulate the influence of moisture on the water-based acrylate adhesives that are often used in medical applications in the case of TTS. Adhesives of this kind are readily used since they do not release any environmentally harmful substances; however, they are sensitive to water or moisture. Demineralized water, also referred to as deionized water, desalinated water or deionate, is water ($H_2O$) without the salts that occur in normal spring and tap water, which are dissolved as anions and cations.

Another advantageous embodiment consists in that the force that deforms the planar substrate in an oscillating manner is designed as a pressure force which produces a deflection of the substrate orthogonal to its surface, said deflection traveling or rotating in the adhesive region. Such a traveling orthogonal deflection approximates relatively closely to the movement of skin areas on extremities, e.g. in joint areas, in which there is repeated stretching and folding. This is supported by another embodiment that is advantageous in this regard and that consists in that the planar substrate is put under tension during the action of force.

In order to provide a reproducible load population, another advantageous embodiment consists in that the force that deforms the planar substrate in an oscillating manner is applied in such a way by a dumbbell-shaped magnetic stirring rod driven by a magnetic stirrer and movable in a vessel that the magnetic stirring rod, also referred to as a "stirring flea" in the jargon of testing laboratories, rotates underneath the planar substrate while deforming the latter, preferably at a speed of rotation of 100 to 120 rpm and over a period of time of 24 hours. After this, even an optical test for the abovementioned lifting in the edge region of the applied adhesive, planar body can provide informative results.

Another advantageous embodiment consists in that the vessel accommodating the dumbbell-shaped magnetic stirring rod is filled with a lubricant, with between 50 and 75% of its volume preferably being filled with demineralized water. Depending on the shape and material of the dumbbell-shaped magnetic stirring rod, the latter namely generates a considerable friction between the loaded surface of the planar substrate and the surface of the dumbbell-shaped magnetic stirring rod which is in contact with the planar substrate during the oscillatingly reversible deformation, and this can lead to damage or destruction of the planar substrate by abrasion. The filling of the vessel with a lubricant comprising demineralized water advantageously reduces this friction and, on the other hand, keeps the moistening of the planar substrate within the desired limits over the test period.

To carry out the method according to the invention, a particularly suitable testing device is one which has a vessel open at the top, preferably a cylindrical beaker, and an element in the form of a dumbbell-shaped magnetic stirring rod, which is arranged movably in the vessel and projects vertically above the vessel rim. The testing device furthermore comprises a drive, which brings about a rotary and/or stirring movement of the element in the vessel, wherein the drive is designed as a magnetic stirrer (7) arranged underneath the vessel.

A vessel opening designed for the placement of the planar substrate, which can project beyond the area of the vessel opening and covers the element which brings about the rotary and stirring movement, wherein the planar substrate is provided in such a way on its upper side with the adhesive, planar body that the latter is situated at least partially above the vessel opening and in the region of the rotary and/or stirring movement, completes the testing device. The device furthermore has a holding device for fixing the planar substrate, which can engage on the substrate surfaces that project beyond the vessel opening and can fix the planar substrate in such a way that the underside of the holding device clamps and optionally spans the vessel opening and the movable element.

An advantageous further development of the testing device consists in that the movable element which projects beyond the vessel rim is of dumbbell-shaped design, namely in the form of a rod connected at the ends to balls or disks. The diameter of the balls or disks is greater than the inner rim height of the vessel, as a result of which the dumbbell-shaped element projects with its balls or disks arranged at the ends vertically beyond the vessel rim.

With such a design of the element, the required mechanical loading is effected by a force acting at two spaced-apart points of contact between the balls or disks of the dumbbell-shaped element and the planar substrate. A rotation or a stirring movement of such an element is then sufficiently twist-free and balanced with respect to reaction forces, and therefore it is not possible for constant load peaks to occur at only a few points of the planar substrate.

Another advantageous embodiment of the testing device consists in that the movable element is designed as a magnetic, preferably plastic-coated, magnetic stirring rod. This makes it possible to resort to standard components which are universally available and known. The known magnetic stirring rods, stirring fleas or stirring magnets are usually coated with plastic (e.g. PTFE) or glass to reduce friction and in addition are chemically inert.

Another advantageous embodiment of the testing device consists in that the holding device has a base plate provided with a receptacle or through-aperture for the vessel. In the edge region of the base plate, holding or clamping devices, which are arranged around the receptacle or aperture, preferably symmetrically and at equal distances, are provided. In particular, simple threaded rods provided with wing nuts can be used here, by means of which it is possible to mount the planar substrate, which is provided with corresponding punched-out portions for the threaded rods. Thus, on the one hand, the vessel is held positively on the base plate and cannot be displaced by the stirring movement, while, on the other hand, an adjustable tension is provided in a very simple manner for the planar substrate, which tension can be varied as finely as desired, for example by means of washers between the substrate and the base plate.

Another embodiment of the testing device, which is likewise advantageous in terms of the most variable possible tension and adjustment, consists in that one or more spacer plates are provided between the planar substrate and the base plate. These spacer plates are each provided with through-holes for the vessel and for the threaded rods which are congruent with the aperture or receptacle in the base plate and are preferably of the same dimensions as the base plate. The spacer plates can be fixed jointly with the planar substrate by means of the threaded rods provided with wing nuts and likewise serve to adapt the tension at different vessel heights and dimensions of the movable elements.

A qualitative test, which is advantageous on account of its simplicity, of the remaining adhesion of the adhesive, planar body consists in that a visual inspection for detachment phenomena is carried out. After a predetermined load population has been run through, the mechanical loading is ended, and the remaining adhesion of the adhesive, planar body, in particular the remaining adhesion at the edges thereof, is assessed visually, as mentioned above. The loss of adhesion at the edges is namely evident from detachment and lifting of the edges. The detachment can then be easily ascertained by a visual inspection and described, for example, in rough percentages of the circumference of the adhesive, planar body.

In order to establish comparability of the test, even at different locations and when testing is carried out by different persons, quantitative methods are of course more suitable for determining the residual adhesion of the adhesive, planar body. A quantitative statement can advantageously be arrived at by determining the adhesive areas which remain between the adhesive, planar body and the planar substrate after the end of the mechanical loading.

This is advantageously accomplished by means of a mesh, preferably a transparent mesh film, placed on the adhesive, planar body. The raised, no longer adhering surface portions are visible through the mesh or mesh film, for example in the form of bulges or crinkles of the adhesive, planar body. In this way, the ratio of the "still adhering" surface portion of the adhesive, planar body to its total area can be determined.

This is illustrated by a simple example with reference to a TTS bonded to a planar substrate and assessed for its remaining adhesive strength after the end of the mechanical loading. In order to quantitatively determine the remaining adhesive property, the area which is still adhering after loading is set in relation to the total area of the TTS. For this purpose, a transparent film with a mesh (e.g. millimeter paper as a film) is placed on the TTS after loading. The raised area as well as the total area can now be determined by counting the grid squares. The difference indicates the size of the still adhering area. The following applies:

$$H = \frac{(G-A) \times 100}{G}$$

H=percentage of the adhering area after testing
G=total test area
A=area(s) detached after the test The total area can also be determined by calculation for the sake of simplicity:

$$G = \frac{D^2 \times \pi}{4}$$

D=diameter of the test area in mm

Another advantageous method for assessing the remaining adhesion of a transparent, adhesive, planar body consists in determining in a similar manner the ratio of opaque surface portions to transparent surface portions of the adhesive, planar body. This makes use of the effect that transparent adhesive layers are almost transparent in the regions in which they adhere firmly to a planar substrate, while they appear rather opaque in non-adhering regions. This is due to the fact that different refraction and reflection properties arise at the adhesive-air phase boundary than at the adhesive-substrate phase boundary.

In another advantageous embodiment of the method, the remaining adhesion of an adhesive, planar body can also be assessed quantitatively by measuring and comparing the pull-off force from the planar substrate before and after mechanical loading. This is preferably carried out by means of a peel test known in the prior art, which can be carried out, for example, as a 90° peel test or else as a 180° peel test. The latter is more suitable in the case of relatively soft substrates since the substrate is then only loaded by pull-off forces acting in parallel and in its surface.

Figure 2:
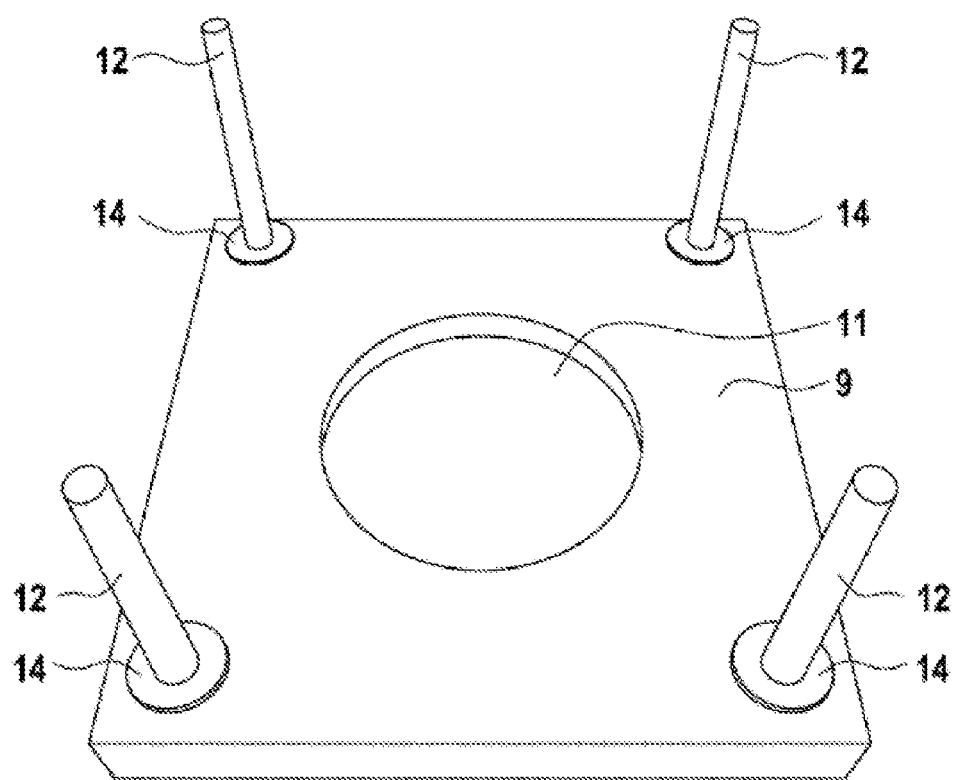
Figure 3:
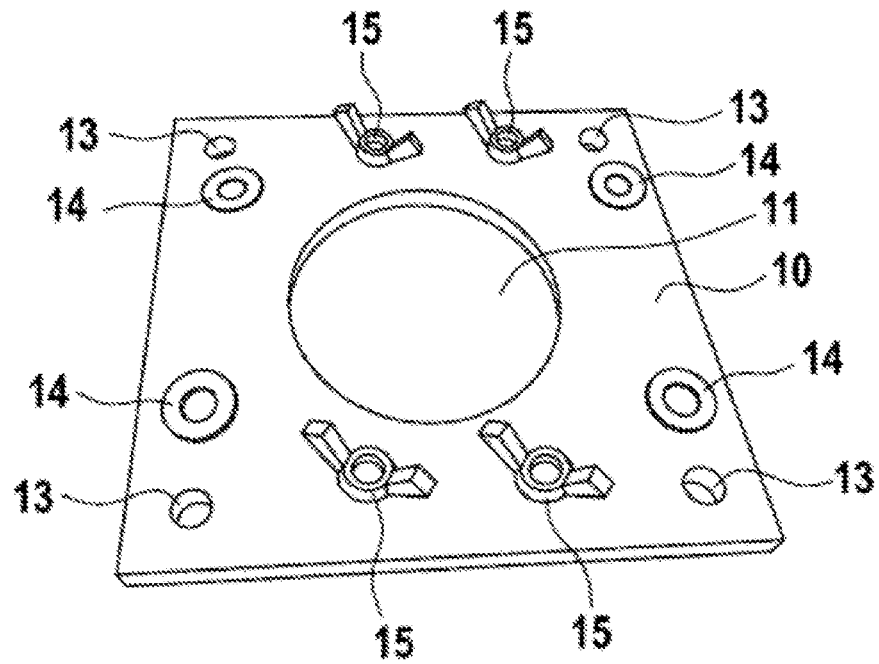
Figure 4:
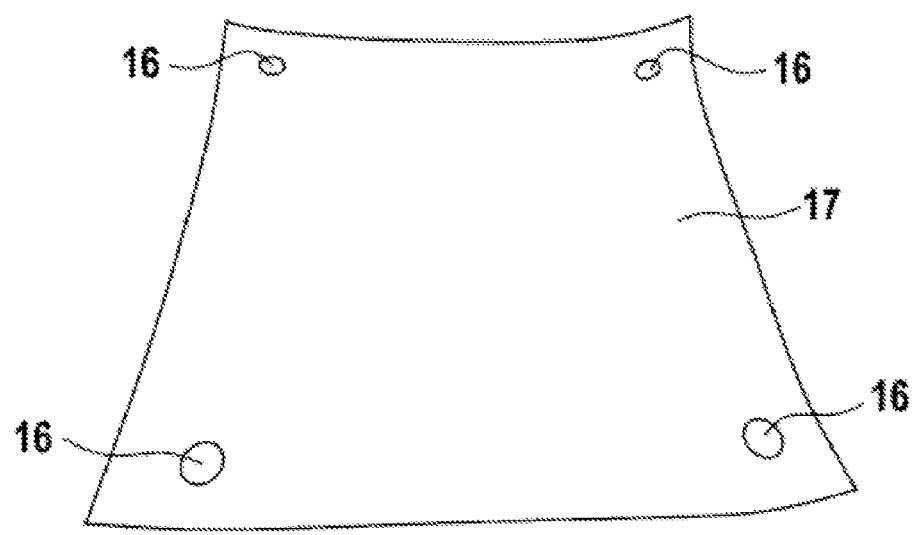
Figure 5:
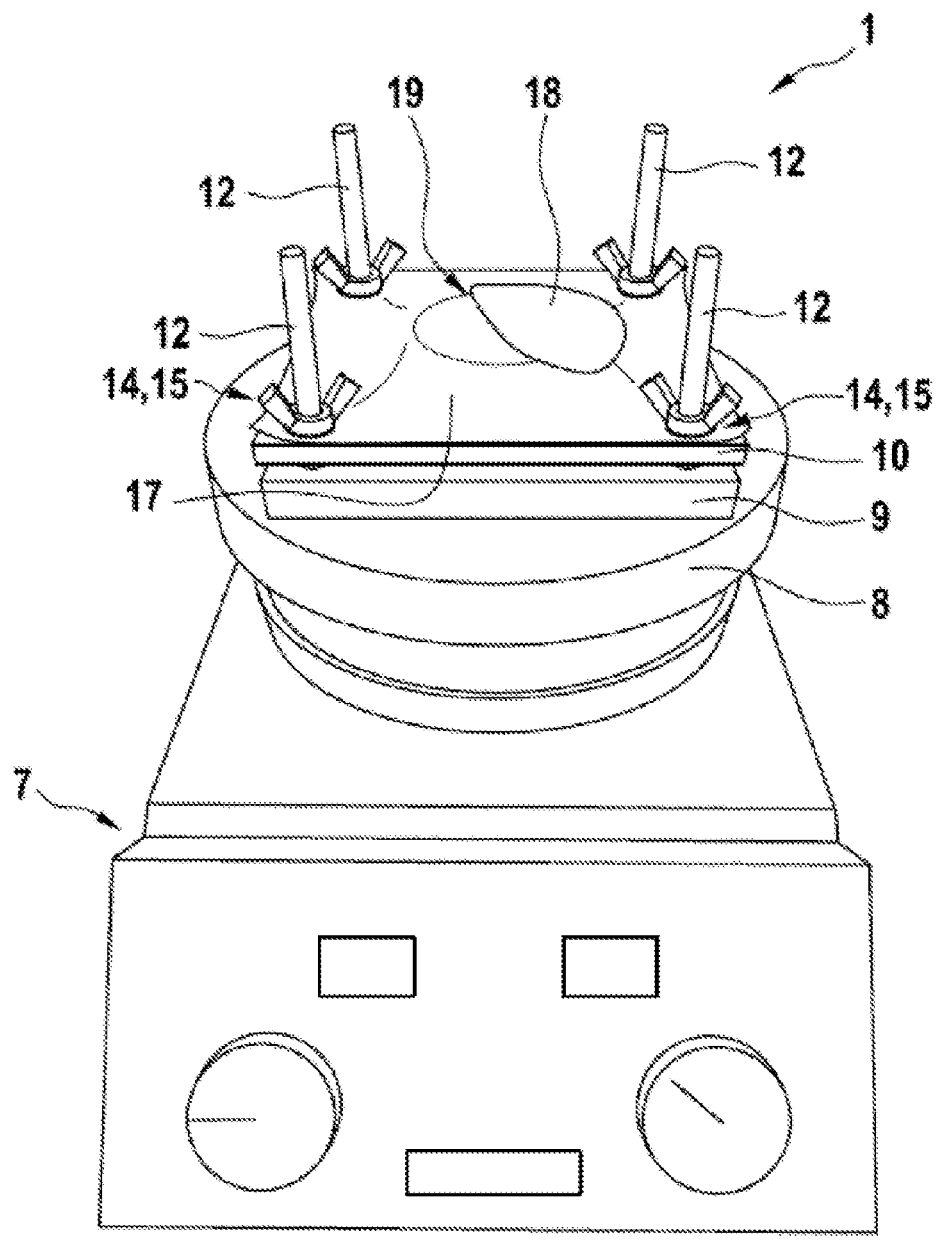

The invention will be explained in greater detail by means of an exemplary embodiment. In the drawings:

FIG. 1 shows a testing device according to the invention without a mounted planar substrate, FIG. 2 shows a base plate of the testing device according to the invention in FIG. 1, FIG. 3 shows a spacer plate of the testing device according to the invention according to FIG. 1, FIG. 4 shows a planar substrate for use in the testing device according to the invention in FIG. 1, FIG. 5 shows a testing device according to the invention as shown in FIG. 1 in the operating state.

FIG. 1 shows an overall view of a testing device 1 according to the invention but, for the sake of clarity, initially without the mounted planar substrate 17.

A vessel which is open at the top, here in the form of a cylindrical beaker 2, in which there is a movable element, namely the movably arranged, plastic-coated, dumbbell-shaped magnetic stirring rod 3, also referred to as a "stirring flea", can be clearly seen. The dumbbell-shaped magnetic stirring rod 3 consists of a rod 6 connected at its ends to disks 4, 5. In its central, rod-shaped region/in the rod 6, the dumbbell-shaped magnetic stirring rod 3 has a magnetic core (not shown specifically here).

The disks 4 and 5 project 4 mm beyond the upper rim of the beaker 2.

Here, a magnetic stirrer 7 is used to drive the dumbbell-shaped magnetic stirrer rod 3 having a magnetic core, said magnetic stirrer having within its table 8 at least one electrically driven rotating magnet with an adjustable speed of rotation. Magnetic stirrers 7 of this kind are known and are therefore also not explained further here. The rotating magnet within the table 8 acts on the magnet core in the dumbbell-shaped magnetic stirring rod 3 and likewise sets the latter into rotary motion.

Of course, the dumbbell-shaped magnetic stirring rod 3, that is to say the element which acts on the planar substrate 17 on the side of the latter facing away from the glued-on test specimen and mechanically loads the substrate 17, can be designed with a shape other than the dumbbell shape used here, for example as a roller-shaped element or as a ball positively guided on a circular path. The drive of the element can also be designed differently, for example with an electric motor which is connected to the stirring element by a shaft which extends directly into the vessel via a rotary union.

FIG. 1 furthermore shows a base plate 9 and a spacer plate 10, as also illustrated more clearly in FIGS. 2 and 3. The base plate 9 and the spacer plate 10 are provided with a through-aperture 11 for the beaker 2. Alternatively, such an aperture 11 in the base plate 9 can also be designed as a receptacle for the beaker 2, namely as a depression provided in the base plate 9 and having approximately the outer diameter of the beaker 2. Of course, both the base plate 9 and the spacer plates 10 can be a of different geometrical design from that in this exemplary embodiment, for example in a shape other than the rectangular shape provided here. The same applies to the aperture 11 or receptacle for the vessel and to the vessel as such.

In the edge region of the base plate 9, threaded rods 12 distributed around the aperture 11 are screwed into corresponding threaded holes of the base plate 9. The spacer plate 10 has through-holes 13 that are congruent therewith. Together with washers 14 placed in a corresponding number and the wing nuts 15, the threaded rods 12, base plate 9 and spacer plate 10 form a holding device for the planar substrate 17. The latter is provided with punched-out portions 16, which are congruent with the through-holes 13. This can be seen in FIG. 4. Here, the planar substrate 17 consists of wash leather, also referred to as "chamois leather".

The closed or clamped holding device or mounting can be seen in FIG. 5, in which the entire testing device 1 is shown in its assembled state, that is to say ready for use in the operating state.

It can be seen here that the planar substrate 17 is placed on the cylindrical beaker 2 and is firmly clamped on the spacer plate 10 arranged above the base plate 9 with the aid of the threaded rods 12, the washers 14 and the wing nuts 15. The beaker 2 and the dumbbell-shaped magnetic stirring rod 3 are therefore located underneath the planar substrate 17 in this view or arrangement and are therefore not visible in FIG. 5.

The drive via the magnetic stirrer 7 with its table 8, the beaker 2 and the design of the dumbbell-shaped magnetic stirrer rod 3 have already been described above.

The adhesive, planar body 18 to be tested is applied to the planar substrate 17, in this case designed as a transdermal therapeutic system (TTS) which is applied adhesively. As can be seen, the adhesive, planar body 18, that is to say the test specimen, is situated partially above the vessel opening and in the region of the stirring movement, namely in this case approximately with ⅓ of its total area, so that, in this test arrangement, the edge region 19 of the TTS 18 is subjected to particularly strong stress by the deformation and force applied via the dumbbell-shaped magnetic stirring rod 3.

In the testing device 1 according to the invention, loads due to the dead weight of the dumbbell-shaped magnetic stirring rod 3 or due to the gravitational force acting on the planar substrate are avoided.

A test of the remaining adhesion carried out with this arrangement and testing device 1 showed that, after 24 hours of operation of the testing device 1, in which the dumbbell-shaped magnetic stirring rod 3 rotated at 110 rpm, no noticeable detachment could be detected in the edge region 19.

LIST OF REFERENCE SIGNS (Part of the Description)
- 1 testing device
- 2 beaker, open at the top
- 3 dumbbell-shaped magnetic stirring rod (stirring flea)
- 4 end disk of the magnetic stirring rod
- 5 end disk of the magnetic stirring rod
- 6 central, rod-shaped region of the magnetic stirring rod
- 7 magnetic stirrer
- 8 table of the magnetic stirrer
- 9 base plate
- 10 spacer plate
- 11 aperture for the beaker
- 12 threaded rod
- 13 through-hole
- 14 washer
- 15 wing nut
- 16 punching-out portion
- 17 planar substrate
- 18 adhesive, planar body (TTS)
- 19 edge region of the planar body 18

The invention claimed is:

1. A method for testing the adhesion of an adhesive, planar body (18) on a substrate (17), comprising first of all applying the body (18) adhesively to the substrate (17), then moistening the substrate (17), and exerting a mechanical force on the substrate by means of an element in the form of a dumbbell-shaped magnetic stirring rod (3) acting on the side of the substrate (7) facing away from the body (18), and repeatedly reversibly deforming the substrate (17) at least in parts of the adhesive region of the body (18) by the action of the force and, after a period of time encompassing a predetermined load population, ending the mechanical loading, and assessing qualitatively and/or quantitatively the remaining adhesion of the body (18) wherein the force which repeatedly deforms the substrate (17) is exerted by a dumbbell-shaped magnetic stirring rod (3) driven by a magnetic stirrer (7) and movable in a vessel (2) open at the top, in such a way that the dumbbell-shaped magnetic stirring rod rotates underneath the substrate while deforming the latter.

2. The method as claimed in claim 1, wherein the substrate (17) is wash leather, split leather, grained synthetic leather film, artificial skin, animal or human skin.

3. The method as claimed in claim 1, in which the substrate (17) is moistened to saturation or impregnation.

4. The method as claimed in claim 1, in which the force that repeatedly deforms the substrate (17) is designed as a pressure force which produces a deflection of the substrate orthogonal to its surface, said deflection traveling or rotating in the adhesive region.

5. The method as claimed in claim 1, in which the substrate is subjected to stress during the action of the force.

6. The method as claimed in claim 1, in which the dumbbell-shaped magnetic stirring rod (3) rotates underneath the substrate at a speed of rotation of 100 to 120 rpm and over a period of time of 24 h, while deforming said substrate.

7. The method as claimed in claim 6, in which the vessel (2) accommodating the dumbbell-shaped magnetic stirring rod (3) is filled with a lubricant, with between 50 and 75% of its volume optionally being filled with demineralized water.

8. The method as claimed in claim 1, in which the remaining adhesion of the adhesive, planar body (18) is assessed qualitatively by visual inspection for detachment phenomena.

9. The method as claimed in claim 1, in which the remaining adhesion of the adhesive, planar body (18) is assessed quantitatively by determining the remaining adhesive areas.

10. The method as claimed in claim 9, in which the ratio of the proportion of the area in which there is still adhesion to the total area of the body (18) is determined by means of a mesh placed on the adhesive, planar body (18).

11. A method for assessing the remaining adhesion of a transparent, adhesive, planar body (18), comprising carrying out the method as claimed in claim 9, and determining the proportion of opaque surface portions to transparent surface portions of the adhesive, planar body (18).

12. The method as claimed in claim 1, in which the remaining adhesion of the adhesive, planar body (18) is assessed quantitatively by measuring and comparing the pull-off force from the substrate before and after the mechanical loading.

13. A device (1) for testing the adhesion of an adhesive, planar body (18) on a substrate (17) by a method as claimed in claim 1, wherein the testing device has the following features:
 a vessel (2) open at the top,
 an element (3) in the form of a dumbbell-shaped magnetic stirring rod (3), which is arranged movably in the vessel (2) and projects vertically above the vessel rim,
 a drive (7), which brings about a rotary and/or stirring movement of the element in the vessel (2), wherein the drive is designed as a magnetic stirrer (7) arranged underneath the vessel,
 wherein the vessel opening is designed for the placement of the planar substrate (17), which can project beyond the area of the vessel opening and covers the element (3) which brings about the rotary and stirring movement, wherein the planar substrate (17) is provided in such a way on its upper side with the adhesive, planar body (18) that the latter is situated at least partially above the vessel opening and in the region of the rotary and/or stirring movement, wherein the device furthermore has a holding device (9, 10, 12, 14, 15) for fixing the planar substrate (17), which can engage on the substrate surfaces that project beyond the vessel opening and which can fix the planar substrate (17) in such a way that the underside of the holding device (9, 10, 12, 14, 15) clamps and optionally spans the vessel opening and the movable element (3).

14. The testing device as claimed in claim 13, in which the movable element (3) which projects beyond the vessel rim is of dumbbell-shaped design in the form of a rod (6) connected at the ends to balls or disks (4, 5), wherein the diameter of the balls or disks (4, 5) is greater than the inner rim height of the vessel (2).

15. The testing device as claimed in claim 13, in which the movable element is designed as a magnetic, optionally plastic-coated, magnetic stirring rod (3).

16. The testing device as claimed in claim 13, in which the holding device has a base plate (9) provided with a receptacle or through-aperture (11) for the vessel (2), wherein holding or clamping devices (12, 14, 15) arranged in the edge region around the receptacle or aperture (11), optionally threaded rods (12) provided with wing nuts (15), by means of which it is possible to mount the substrate (17), which is provided with corresponding punched-out portions (16) for the threaded rods (12), are provided.

17. The testing device as claimed in claim 16, in which one or more spacer plates (10), which are each provided with congruent apertures and through-holes (11, 13) for the vessel (2) and the threaded rods (12) and can be fixed jointly with the substrate (17), are provided between the substrate (17) and the base plate (9).

* * * * *